No. 858,992. PATENTED JULY 2, 1907.
A. H. KNOX.
PITCHFORK.
APPLICATION FILED DEC. 22, 1906.
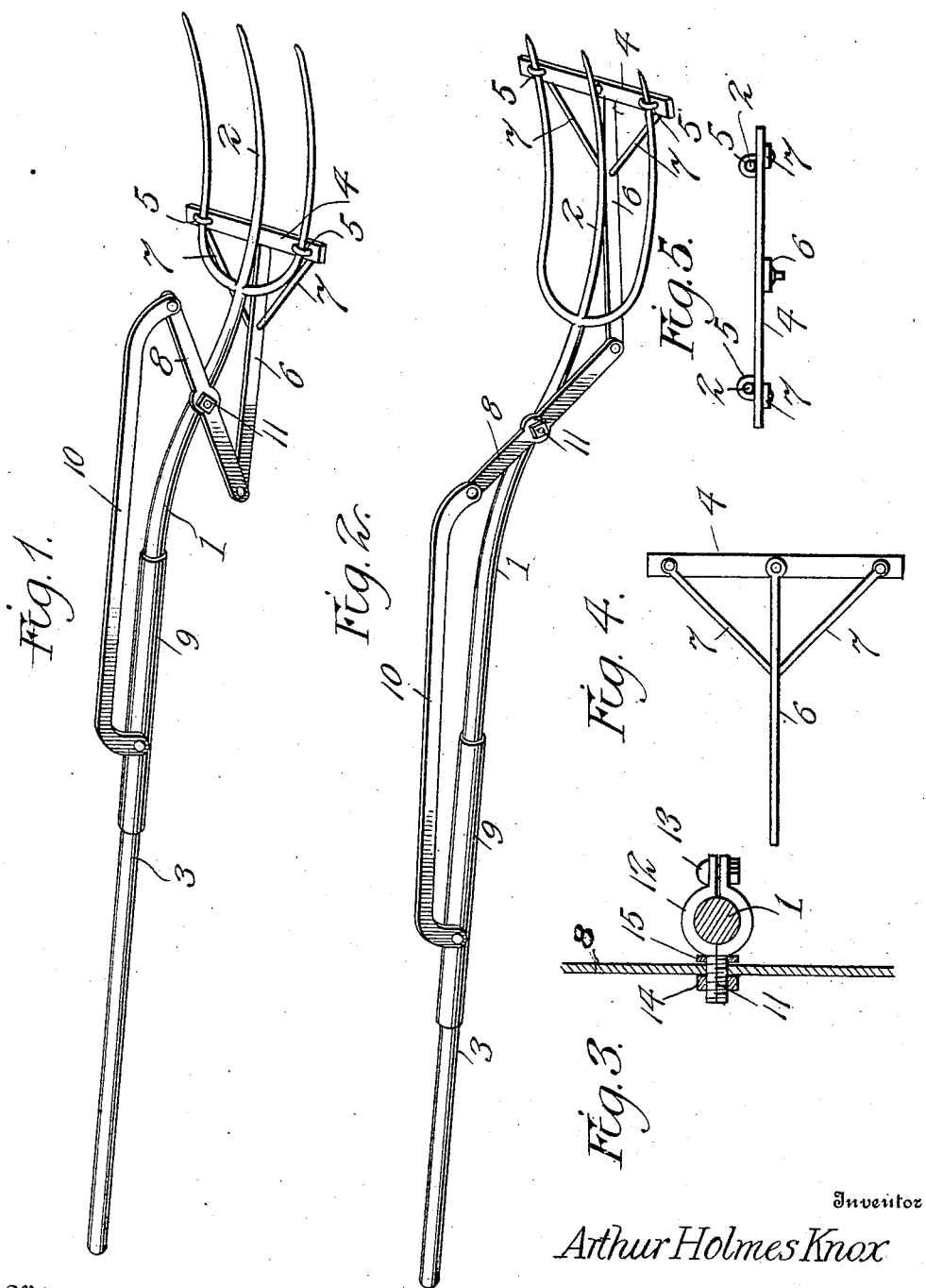
Inventor
Arthur Holmes Knox
Witnesses
By Victor J. Evans
Attorney

UNITED STATES PATENT OFFICE.

ARTHUR HOLMES KNOX, OF BELOIT, WISCONSIN.

PITCHFORK.

No. 858,992.　　　　　Specification of Letters Patent.　　　　Patented July 2, 1907.

Application filed December 22, 1906. Serial No. 349,185.

*To all whom it may concern:*

Be it known that I, ARTHUR HOLMES KNOX, a citizen of the United States of America, residing at Beloit, in the county of Rock and State of Wisconsin, have invented new and useful Improvements in Pitchforks, of which the following is a specification.

This invention relates to improvements in pitchforks, being primarily designed to provide an attachment for pitchforks whereby stalks and other substances sticking or clinging to the tines of the fork may be quickly and conveniently dislodged and projected therefrom, thus obviating the necessity of violently jerking the pitchfork or dislodging the clinging material by pressure of the foot or by rubbing the fork against the edge of a wagon box, manger or other article.

The object of the invention is to provide a cleaning attachment of this character which is simple of construction, may be applied to forks already in use and of conventional types without altering the construction thereof, and which is effective for the purpose of dislodging particles of stalks, hay and other substances which are being pitched from the tines of the fork and projecting the same therefrom.

In the accompanying drawing,—Figure 1 is a perspective view of a pitchfork embodying my invention, showing the cleaner in normal or retracted position. Fig. 2 is a similar view showing the cleaner projected. Fig. 3 is a section through the fork handle and link, showing the mode of mounting the latter upon the handle. Figs. 4 and 5 are, respectively, a top plan view and a front elevational view of the reciprocating cleaner.

Referring to the drawings, 1 represents a pitchfork of ordinary construction, comprising a fork proper 2 and operating handle 3.

Arranged to reciprocate upon the fork 2 is a cleaning or clearing device embodying a bar 4 extending transversely of the fork below the tines thereof and slidably connected with the side tines by staples or other suitable guides 5, adapted to permit the bar to have a sliding or reciprocatory movement. A shank 6 extends rearwardly from the center of the bar 4 and is reinforced therefrom by diagonal braces 7, the rear end of said shank being pivotally connected to the lower end of a link 8, the upper end of which is in turn pivotally connected with an operating slide or sleeve 9 on the handle 3 by a connecting rod 10. The link 8 is mounted intermediate for pivotal movement upon a stem 11 carried by a two-part bracket 12 engaging the handle, the parts of the bracket being clamped at one side by a connecting bolt 13 and at the opposite side by a nut 14 engaging the projecting end of the stem 11, which is properly threaded for its reception. The nut 14 also retains the link 8 in position on the stem, a washer 15 being applied between the clamp and link to guide the latter for movement in a determined plane and thus prevent the link from wabbling.

In operation, the fork is employed in the usual way for the purpose of gathering the corn stalks, hay or other substances to be handled, the rear end of the handle 3 being grasped by one of the hands of the operator, while the other hand of the operator grasps the sleeve 9. After the load has been gathered by the fork and the latter elevated to toss the same in the ordinary manner, the sleeve 9 is drawn rearward by the operator, thereby swinging the link on its fulcrum to shift the cleaning or clearing bar forward on the fork proper from the position shown in Fig. 1 to that shown in Fig. 2. By this action the bar in its forward movement will engage the stalks or other material held by the fork and will slide the same forward, thus freeing all portions of the material from the fork. By imparting to the clearing bar a sudden thrust toward the limit of its forward movement, any portions of the material which tend to hang upon the tines may be projected with force to a considerable distance, thus increasing the efficiency of action of the clearing device. After the load has been dislodged in the manner described, the sleeve is forced forwardly to retract the clearing bar, a new load taken up upon the fork and the operation repeated as before.

It will be seen that my invention provides a simple, convenient and efficient construction of clearing device which is applicable to any ordinary pitchfork, and by means of which the fork may be freed from all portions of its load without additional labor on the part of the operator, thereby obviating the necessity of the operator dislodging hanging portions with his foot or hand or striking or rubbing the fork against an object to free the hanging portions of the material therefrom.

Having thus described the invention, what is claimed as new, is:—

In a cleaning attachment for tools, the combination, with a pitchfork, of a transverse clearer bar arranged, below the tines of the fork, said bar being provided with guide members engaging the tines to permit the bar to slide longitudinally thereon, a shank extending centrally from the bar, diverging braces connecting the shank with the ends of the bar, a sleeve arranged to reciprocate on the handle of the tool, a link pivotally mounted upon one side of said handle, and connected at its lower end with the shank, and a rod pivotally connecting said sleeve with the upper end of the link.

In testimony whereof, I affix my signature in presence of two witnesses.

ARTHUR HOLMES KNOX.

Witnesses:
　T. D. WOOLSEY,
　WM. N. FAIRMAN.